United States Patent [19]
Hedtke et al.

[11] Patent Number: 4,926,425
[45] Date of Patent: May 15, 1990

[54] SYSTEM FOR TESTING DIGITAL CIRCUITS

[75] Inventors: Rolf Hedtke, Darmstadt-Eberstadt; Rolf Loos, Münster; Roland Mester; Jürgen Hänsel, both of Darmstadt, all of Fed. Rep. of Germany

[73] Assignee: Robert Bosch GmbH, Stuttgart, Fed. Rep. of Germany

[21] Appl. No.: 204,622

[22] Filed: Jun. 9, 1988

[30] Foreign Application Priority Data

Jun. 11, 1987 [DE] Fed. Rep. of Germany ....... 3719497

[51] Int. Cl.$^5$ .............................................. G01R 31/28
[52] U.S. Cl. .................................... 371/22.6; 371/22.4
[58] Field of Search ........................... 371/15, 20, 25; 324/73 R, 73 AT, 73 PC

[56] References Cited

U.S. PATENT DOCUMENTS

| | | | |
|---|---|---|---|
| 4,513,418 | 4/1985 | Bardell, Jr. et al. | 371/25 |
| 4,594,711 | 6/1986 | Thatte | 371/25 |
| 4,701,922 | 10/1987 | Kuboki et al. | 371/25 |
| 4,710,931 | 12/1987 | Bellay et al. | 371/25 |
| 4,718,065 | 1/1988 | Boyle et al. | 371/25 |
| 4,764,926 | 8/1988 | Knight et al. | 371/25 |
| 4,780,666 | 10/1988 | Sakashita et al. | 324/73 R |

Primary Examiner—Charles E. Atkinson
Attorney, Agent, or Firm—Frishauf, Holtz, Goodman & Woodward

[57] ABSTRACT

Test node equipment is provided between successive component groups operating in cascade and each test node is connected to a data bus system through which test patterns can be provided by a test pattern generator and from which signals can be evaluated by a test pattern analyzer, the test pattern generator and the test pattern analyzer being under control of a test computer. Each test node has a state in which the output of the preceding component group passes through it to the next component group with only a possibility of monitoring possible deficiencies by the test computer and other states in which the cascade operation of component groups can be interrupted at a test node for inserting a test pattern to a following component group or receiving a processed test pattern from a preceding component group. A test node may also contain driver circuits for transfer of rapid data to a memory of the test computer for subsequent processing at a lower speed and may also contain equipment to assist in the use of a so-called signature analysis system.

22 Claims, 3 Drawing Sheets

SYSTEM FOR TESTING DIGITAL CIRCUITS

Cross Reference to Related Application of the same applicants: Ser. No. 07/204,194, filed June 8, 1988, claiming priority of German Patent Application No. P 37 19 498.4 filed June 11, 1987.

The invention concerns a system for testing digital circuits, particularly in apparatus comprising circuit groups of digital signal-processing components operated in cascade.

It is known to test digital circuits with logic circuits and analysers which are able to show the nature of signals at various test points in the circuits. In modern test apparatus it is common to compare a reference test pattern which is derived from a properly operating functional group of components with a pattern from a component group just tested and to show only the differences in order to bring out disturbances in function. In these known methods, however, manual application of test clips to test points is necessary. It is further known that large functional units require a greater variety of test patterns than are needed in small functional units. The smaller functional units can be tested in isolation so that, in general, test operators manually separate functional units for test purposes for example by pulling out connection plugs and circuit boards. Furthermore the application of a suitable test pattern to the inputs of the separate functional units to be tested is often necessary.

SUMMARY OF THE INVENTION

It is an object of the present invention to provide a test system for digital circuits, for example digital video circuits, in which the running of a test will be as automatic as possible.

Briefly, test node circuits are interposed between successive circuit component groups that are normally operated in cascade. These test node circuits are connectable for test purposes to a test computer over a test bus.

The test node circuits are equipped to operate under control of the test computer to isolate for test purposes any intermediate portion of the circuit component group succession. The initial and final units of the succession can similarly be isolated by use of additional test nodes at the beginning and end of the succession.

The test node circuits are preferably equipped with certain additional components for participation in test operations, such as registers for storing signals for test evaluation by the test computer so that the test computer does not have to be connected in real time to everything to be tested in the apparatus. It is particularly useful for detection of an abnormal condition for a test node circuit to generate an interrupt signal which will result in the computer interrogating a register to identify an incipient failure.

For further details reference is made to the description given below.

BRIEF DESCRIPTION OF THE DRAWINGS

The invention is further described by way of illustrative example with reference to the annexed drawings, in which.

The same parts and components are designated in the several figures with the same reference numerals.

Figure 1:
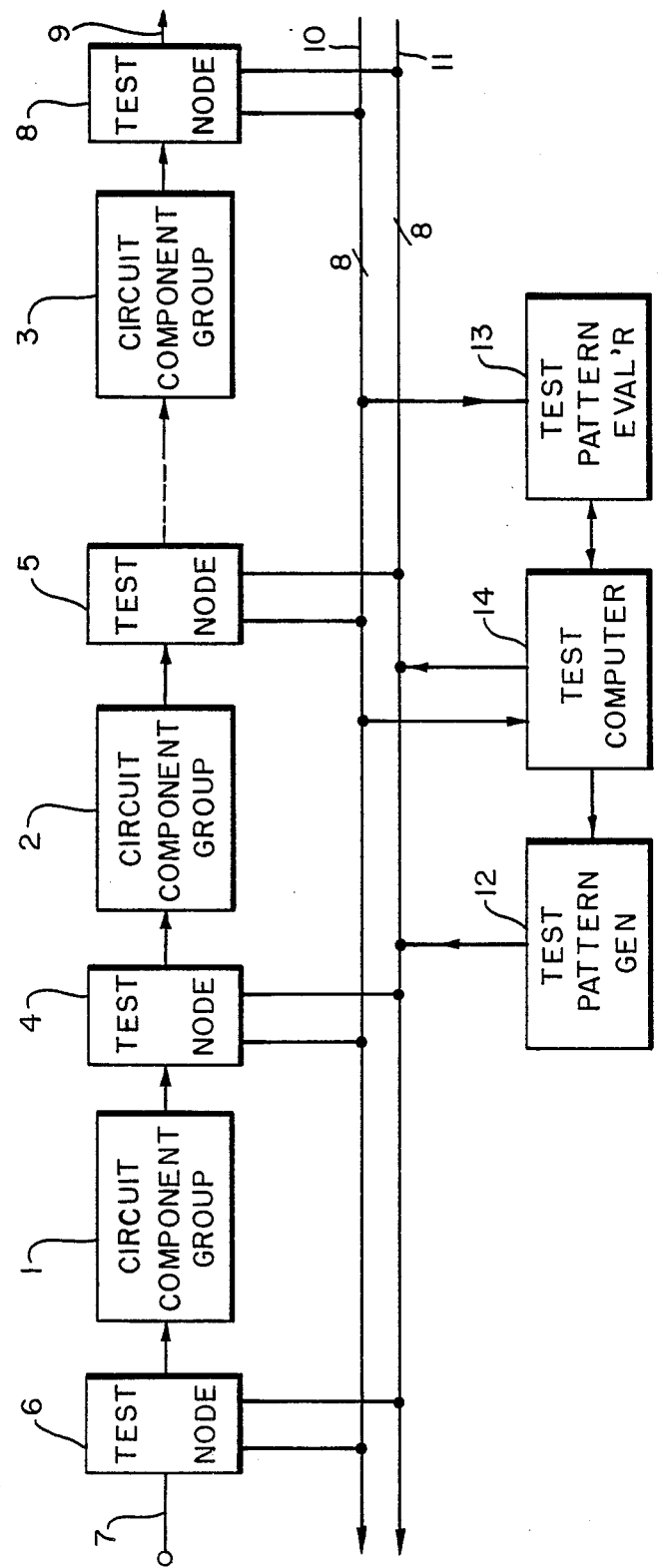
FIG. 1 is a circuit block diagram providing an overall illustration of an embodiment of the invention.

DESCRIPTION OF THE ILLUSTRATED EMBODIMENTS:

In the overall block diagram of FIG. 1 there are shown a number of signal processing circuit component groups 1, 2 and 3 which operate in cascade, the output of one being connected to the input of the next. The component groups 1, 2 and 3 can for example be parts of a digital video tape apparatus, or of a video camera or of a film scanner. Of course these component groups could also be parts of other digital electronic apparatus outside of the field of video technology.

Test nodes 4 and 5 are provided between the component groups 1, 2 and 3. In addition there is a further test node 6 between the input 7 of the apparatus and the first component group 1 and another test node 8 between the output of the last component group 3 and the output 9 of the apparatus as a whole. Two conductor groups 10, 11 form a test bus which is connectable to each of the test nodes.

In addition, the conductor group 11 is connected with the output of a test pattern generator 12, while the conductor group 10 is connected to the input of a test pattern evaluator 13. The conductor groups are, for example, each made up of 8 parallel conductors.

Test pattern generators and test pattern evacuators are known as such and do not need to be further explained in connection with this invention. A test computer 14 takes care of the control of the test pattern generator 12, the test pattern evaluator 13 and the test nodes 1, 2 and 3. It is also possible in the embodiment illustrated in FIG. 1, among other things, to supply a test pattern generated by the test pattern generator 12 through the test node 6 and the first component group 1 in place of the usual input signals of that component group. By corresponding switching of the test node 4, 5 and 8 the signals comprising the outputs of the component groups 1, 2 and 3 can be sequentially evaluated in the test pattern evaluator. In this fashion a simple localization of any possible errors can be accomplished.

Further details of the invention are particularly described with reference to FIG. 2. From the mechanical aspect of the test system, it should first be noted that both the circuit component groups and test node circuits that serve them may each be separate units, for example each being mounted on its own circuit board. The component group to be tested, however, is in general much more extensive than the test node relating to it. Furthermore, relatively many connections are needed between a component group and a test node, which is particularly the case for the example shown in FIG. 3. It will be therefore be useful in many cases to integrate the test node into the corresponding component group. This can be done by putting the test node on a common circuit board with the component group or by providing a so called pick-a-back plate for the test node.

Figure 2:
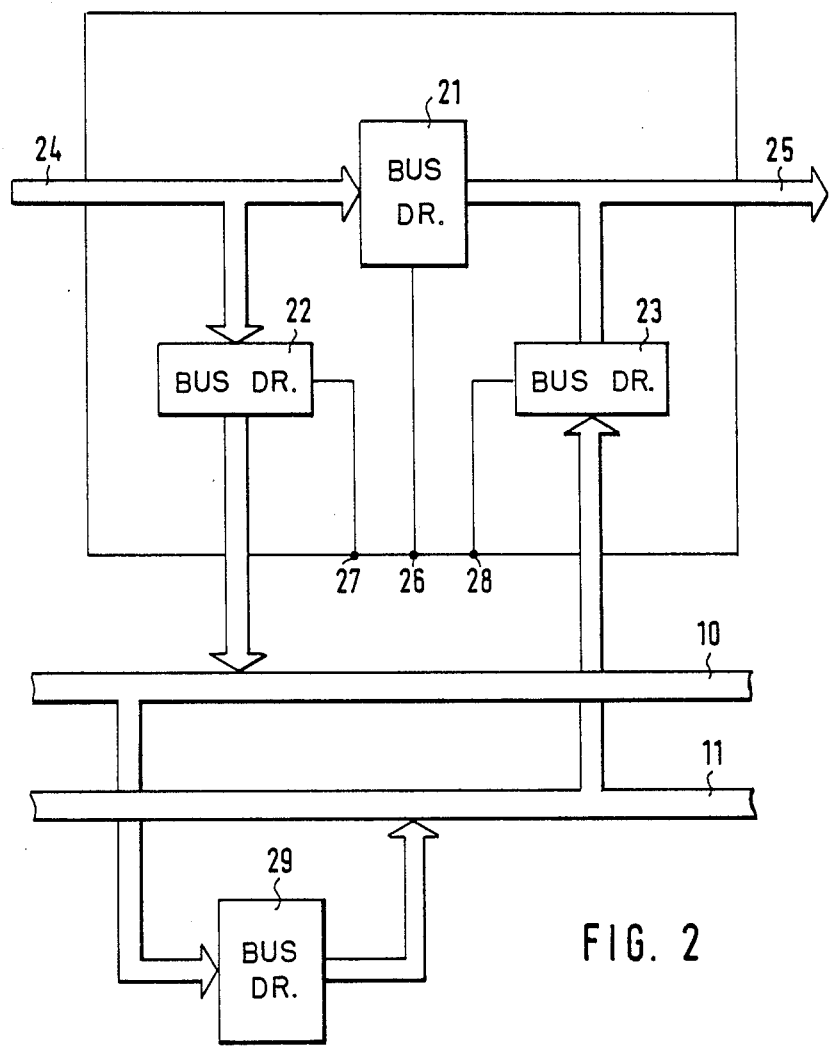
FIG. 2 is a circuit block diagram of a test node.

FIG. 2 shows one of the test nodes in somewhat more detailed representation. The test node circuit includes essentially three unidirectional bus driving circuits 21, 22 and 23. The bus driver 21 connects the input 24 with the output 25 and thereby the output of the preceding component group with the input of the component group that follows the test node. In normal operation of the apparatus to be tested this bus driver is conducting and a corresponding control signal is provided from the input 26.

The bus driving circuit 22 is connected between the input 24 and the test bus 10. The output signals of the preceding module can therefore be supplied to the test bus 10 by applying a corresponding control signal through the input 27.

Finally the bus driving circuit 23 serves to lead signals from the test bus 11 through the input of the following component group for which purpose a control input of the bus driver 23 is connected to still another input 28. With test nodes 4, 5, 6 and 8 of FIG. 1 constructed in accordance with FIG. 2 it is therefore possible to interrupt the signal flow before and after any individual component group, to feed in test patterns and to supply the processed test patterns which have passed through one or more component groups to the test pattern evaluator 13. In order to lead the output signals of one of the component groups to a component group other than the one usually following it, it is provided in the example of FIG. 2 to insert one more bus driving circuit 29, as a switching device, between the test bus 11 and the test bus 10.

Figure 3:
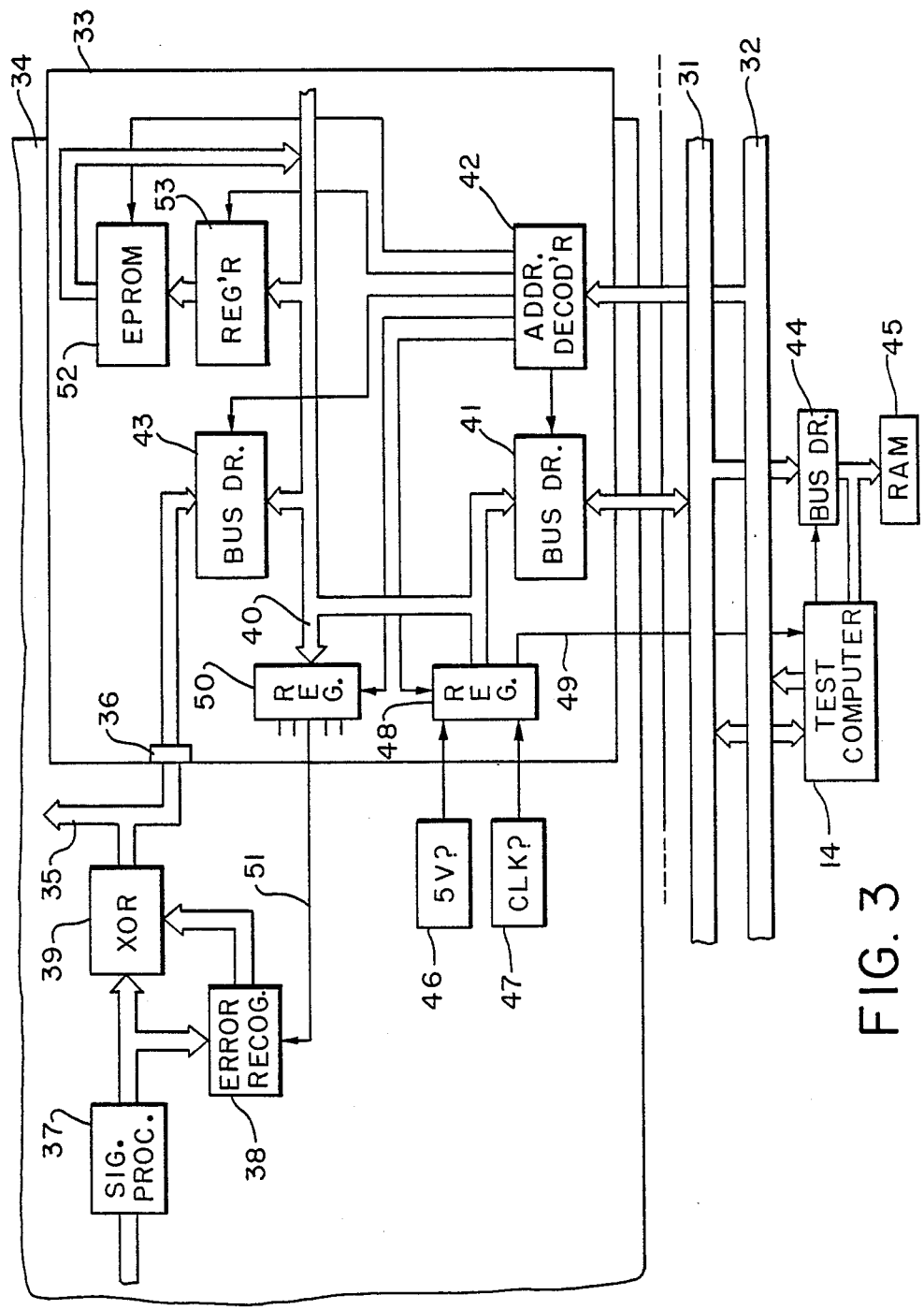
FIG. 3 is a circuit block diagram of part of a system according to the invention showing a more elaborately equipped test node.

In the embodiment shown in FIG. 3 the test bus is subdivided into a data bus 31 and an address bus 32. The test node 33 is related to a component group 34, the output 35 of which is connected with the input of the test node 36. In order to indicate that the circuits described regarding the component group 34 represent only a part of a possibly much more extensive component group, only a part of a circuit board is illustrated holding the components shown.

For explaining the function of the test node shown in FIG. 3 it may be for example assume that the component group 34 includes among other things some kind of signal processing circuit 37, an error recognition circuit 38 and an error correction circuit 39 which is constituted as an exclusive-OR circuit. The error corrected signals proceed from the output 35 of the component group 34 to further processing equipment.

A bus system 40 of the test node 33 can be connected with the data bus 31 through a bidirectional bus driver 41. The bidirectional bus driver is activated by an address decoder 42 which is activated by the test computer 14 by means of the address designating that particular decoder, when the data bus 31 is to be connected with the bus system 40 through the bidirectional bus driver 41, therefore when the test node 33 is to be connected to the test bus.

As in the case of the test node according to FIG. 2 the signals supplied to the input 36 can be supplied to the test system in the case of the test node 33. For this operation the bus driver 43 is switched through in addition to the bidirectional bus driver 41. In many different applications of the test system of the invention, signals of very high data rates are processed by the component groups. It can therefore be useful to write the signals to be checked in a test system memory first for a short period of time and then to check and evaluate the signals at lower speed with the help of the test computer. In the embodiment of FIG. 3 accordingly, a read-write memory (RAM) 45 is connected to the data bus through a bus driver 44. The latter is switched through simultaneously with the bus drivers 41 and 43, so that the prescribed time-section of the signals to be checked will be written into the read-write memory 45. The test computer can then have access to the data stored in the read-write memory 45 and check these out at reduced speed.

The test system according to the invention is suitable both for testing digital circuits during operation and for testing them in a special test mode of operation of the circuits. For monitoring digital operation two sensors 46 and 47 are provided in the component group 34 which respectively provide signals when the operating voltage gets outside of a prescribed tolerance region and when the clock signals drop out. These sensors are connected with respective inputs of a status register 48 to which still other sensors can be connected. In the case of an error signal a data word designating the failure is written into the status register 48. In addition an interrupt signal will be given to the test computer over the conductor 49 in response to which the test computer will interrogate the test node connected to the status register and determine the place and nature of the failure.

Another register 50 has its inputs connected to the bus system 40 and also can receive a control signal from the address decoder 42. Switching signals can be written into the register 50 by the test computer 14 which can produce various changes in the component group 34. Thus the component group can be switched over from normal operation into a test operation. In the embodiment of FIG. 3, there can be performed for a test operation, the furnishing of correction signals out of the error recognition circuit 38 to the error correction circuit 39 in response to a switching control signal supplied over the conductor 51, so that in test operation the output signals of the signal processing circuit 37 can be checked without actually correcting an error.

In order to support a test of the component group 34 in accordance with the signature analysis procedure that is known under that name, an EPROM 52 and a register 53 are provided. In the EPROM 52 reference signatures for various test points in the circuit of the component group 34 are stored.

For testing, the test pattern is applied to an input of the component group. With assistance of a pick-up probe and the signature analysis system, the signatures are obtained from the signals at the test points. In this operation the sequence of test points is given to the test operator from the signature analysis system, for example by indication on a picture screen, and out of the EPROM 52 the corresponding reference signatures are called out and compared to the signatures obtained with the probe. The storage of the reference signatures in the test node has the advantage that in the event of replacement of the component group the test node will likewise be replaced. In this way the result is obtained that the stored reference signatures will always correspond to the state of development of the component group.

Commercially supplied components are available for the bus driver and registers. The status register 48 and the address decoder can be very simply provided with programmable array logic circuits (PAL).

Although the invention has been described with reference to a particular illustrative example, it will be recognized that variations and modifications are possible within the inventive concept.

We claim:

1. System for testing digital circuit apparatus wherein said apparatus comprises circuit groups (1, 2, 3; 34) of digital signal processing components, said circuit component groups being connected in succession, with outputs of preceding circuit component groups being connectable and normally connected to inputs of succeeding circuit component groups, said system comprising:
- a test computer (14) connected to a test pattern generator (12) and to a test pattern evaluator (13);
- test bus means (10, 11, 31, 32) connected to said test computer (14), said test pattern generator (12) and said test pattern evaluator (13), and
- test node circuits (4, 5) respectively connected between successive circuit component groups of said succession, each of said test node circuits being connectable to said test bus means and comprising switching means for selectively connecting together or disconnecting, under control of said test computer, a preceding and a succeeding circuit component group of said succession, a preceding component group and said test bus means and a succeeding component group and said test bus means;
- whereby the said succession of circuit component groups may be interrupted for passing test pattern signals through any of several portions thereof under control of said test computer.

2. System according to claim 1, wherein at least one of said test node circuits is provided with a first register (48) for storing status signals for interrogation by said test computer and wherein detectors (46, 47) are provided within said at least one test node circuit, said detectors having outputs connected to inputs of said first register (48) of said at least one test node circuit (33) for storing status signals representative of respective outputs of said detectors.

3. System according to claim 2, wherein at least one of said detectors (47) provides an output signifying whether a clock signal is present.

4. System according to claim 2, wherein at least one of said detectors (46) provides an output voltage indicating whether a supply voltage value in said apparatus lies within a predetermined tolerance range.

5. System according to claim 2, wherein a second register (50) is provided which is connected to at least one said test node circuit, said second register being connected for having data written into it over said test bus means (31) by said test computer (14) and having outputs connected to control inputs of a said circuit component group for putting said circuit component group into a test mode of operation under control of said test computer (14).

6. System according to claim 1, wherein said test computer (14) has a memory (45) connected thereto, and wherein at least one of said test node circuits has means (41, 43, 44) for transferring rapidly transmitted data to said memory (45) of said test computer under control by the latter for subsequent processing at a slower rate.

7. System according to claim 1, wherein a switching means (23) is provided for at least one of said test node circuits means said switching means being connected to each of two successive component groups between which said test node circuit is connected and connected for control by said test computer (14) over said test bus means for switching connections of said test node circuit from one of said two circuit component groups to the other of said two circuit component groups.

8. System according to claim 1, wherein said test node circuits include first (21) second (22) and third (23) switching means, said first switching means being connected for switching on and off a group of connections between outputs of a preceding circuit component group and inputs of a succeeding circuit component group, said second switching means being for on/off switching of connections between said outputs of said preceding circuit group and said test bus means and said third switching means (23) being connected for on/off switching of connections between said test bus means and said succeeding circuit components group.

9. System according to claims 8, wherein said test bus means comprises two generally parallel groups of conductors, of which a first group (10) is connected to outputs of said test node circuits and to an input of said test pattern evaluator (13) and a second group of conductors (11) is connected to inputs of said test node circuits and to outputs of said test pattern generator (12).

10. System according to claim 9, wherein switching means (29) are provided for controllably making connections between said conductors of said first group and said conductors of said second group of said test bus means.

11. System according to claim 1, wherein there is associated with at least one of said test node circuits (33) a memory unit (52) in which are stored reference signatures for test points in a said circuit component group associated with said at least one test node circuit, said memory unit (52) having means for calling out a selected one of said reference signatures and transmitting it to said test computer in response to interrogation by said test computer for carrying out a signature analysis test.

12. System according to claim 2, wherein circuit means are provided in circuit with said detectors (46, 47) for transmitting an interrupt signal to said test computer (14) for having the test computer interrogate said register (48) whenever a said detector detects an out of tolerance signal or measurement, whereby said status signals stored in said register (48) are made available to said test computer.

13. System according to claim 1, wherein said test computer includes means for setting said apparatus in a self test mode of operation where by output signals of the individual circuit component groups of said succession of groups are sequentially made subject to interrogation by said test computer (14) over the respective test node circuits (4,5) associated with said circuit component groups, for comparison with predetermined reference signals.

14. System according to claim 13, wherein means are provided in said test node circuits whereby in response to said interrogations of said output signals of said circuit component groups output signals are transmitted from a said test node circuit, over said test bus means for being written into an intermediate storage means (45) of said test computer (14).

15. System for testing digital circuit apparatus wherein said apparatus comprises circuit groups (1, 2, 3; 34) of digital signal processing components, said circuit component groups being connected in succession, with outputs of preceding circuit component groups being connectable and normally connected to inputs of succeeding circuit component groups, said system comprising:
- a test computer (14) connected to a test pattern generator (12) and to a test pattern evaluator (13);
- test bus means (10, 11, 31, 32) connected to said test computer (14), said test pattern generator (12) and said test pattern evaluator (13);

intermediate test node circuits (4, 5) respectively connected between successive circuit component groups of said succession, each of said intermediate test node circuits being connectable to said test bus means and comprising switching means for selectively connecting together or disconnecting, under control of said test computer, a preceding and a succeeding circuit component group of said succession, a preceeding component group and said test bus means and a succeeding component group and said test bus means, and terminal test node circuits (6, 8) respectively provided at the apparatus input and the apparatus output and connected to said test bus means for respectively including in tests the first and last circuit component groups in said succession, whereby any one or more of said circuit component groups of said succession less than all of said succession of circuit component groups may be isolated for passing test pattern signals through any of several portions of said isolated groups under control of said test computer.

16. System according to claim 15, wherein at least one of said test node circuits is provided with a first register (48) for storing status signals for interrogation by said test computer and wherein detectors (46, 47) are provided within said at least one test node circuit, said detectors having outputs connected to inputs of said first register (48) of said at least one test node circuit (33) for storing status signals representative of respective outputs of said detectors.

17. System according to claim 16, wherein a second register (50) is provided, which is connected to at least one of said test node circuit, said second register being connected for having data written into it over said test bus means (31) by said test bus computer (14) and having outputs connected to control inputs of a said circuit component group for putting said circuit component group into a test mode of operation under control of said test computer (14).

18. System according to claim 15, wherein said test bus means comprises two generally parallel group of conductors, of which a first group (10) is connected to outputs of said test node circuits and to an input of said test pattern evaluator (13) and a second group of conductors (11) is connected to inputs of said test node circuits and to outputs of said test pattern generator (12).

19. System according to claim 18, wherein switching means (29) are provided for controllably making connections between said conductors of said first group and said conductors of said second group of said test bus means.

20. System according to claim 15, wherein circuit means are provided in circuit with said detectors (46, 47) for transmitting an interrupt signal to said test computer (14) for having the test computer interrogate said register (48) whenever a said detector detects an out of tolerance signal or measurement, whereby significant status signals stored in said register (48) are promptly made usefully available to said test computer only.

21. System according to claim 15, wherein said test node circuits include means for setting said apparatus in a self-test mode of operation whereby output signals of the individual circuit component groups of said succession of groups are sequentially made subject to interrogation by said test computer (14) over the respective test node circuits (6, 4, 5, 8) associated with said circuit component groups, for comparison with predetermined reference signals.

22. System according to claim 19, wherein means are provided in said test node circuits whereby in response to said interrogations of said output signals of said circuit component groups output signals are transmitted from a said test node circuit, over said test bus means, for being written into an intermediate storage means (45) of said test computer (14).

* * * * *